(12) United States Patent
Calleri

(10) Patent No.: US 12,624,602 B2
(45) Date of Patent: May 12, 2026

(54) METHOD FOR DETERMINING A FLOW RATE OF A DRILLING MUD IN A SUBSOIL DRILLING SYSTEM

(71) Applicant: GEOLOG S.R.L., San Giuliano Milanese (IT)

(72) Inventor: Antonio Calleri, San Giuliano Milanese (IT)

(73) Assignee: Geolog S.R.L., San Giuliano Milanese (IT)

( * ) Notice: Subject to any disclaimer, the term of this patent is extended or adjusted under 35 U.S.C. 154(b) by 496 days.

(21) Appl. No.: 18/319,583

(22) Filed: May 18, 2023

(65) Prior Publication Data

US 2023/0374872 A1 Nov. 23, 2023

(30) Foreign Application Priority Data

May 19, 2022 (IT) ......................... 102022000010436

(51) Int. Cl.
| | |
|---|---|
| *E21B 21/08* | (2006.01) |
| *G01F 1/36* | (2006.01) |
| *G01F 15/18* | (2006.01) |

(52) U.S. Cl.
CPC .............. *E21B 21/08* (2013.01); *G01F 1/363* (2013.01); *G01F 15/185* (2013.01)

(58) Field of Classification Search
CPC ........ E21B 47/103; E21B 21/08; G01F 1/363; G01F 15/185
See application file for complete search history.

(56) References Cited

U.S. PATENT DOCUMENTS

| | | | |
|---|---|---|---|
| 4,703,664 A | 11/1987 | Kirkpatrick et al. | |
| 10,711,594 B2 * | 7/2020 | Rustad | E21B 37/06 |
| 11,143,540 B2 * | 10/2021 | Jamison | G01F 1/74 |
| 11,268,372 B2 * | 3/2022 | Calleri | G01F 1/74 |
| 11,808,149 B2 * | 11/2023 | Syresin | E21B 47/138 |

FOREIGN PATENT DOCUMENTS

GB 1 562 867 A 3/1980

OTHER PUBLICATIONS

Italian Search Report dated Dec. 21, 2022, issued in Italian Application No. 102022000010436, filed May 19, 2022.

* cited by examiner

*Primary Examiner* — An H Do
(74) *Attorney, Agent, or Firm* — Workman Nydegger

(57) ABSTRACT

Method for determining a flow rate of a drilling mud in a subsoil drilling system which includes a main duct and a bypass conduit. The bypass conduit has a narrowed section. The method includes: feeding the bypass conduit with drilling mud, coming from a drilling well formed by the system and carrying drilling cuttings; coupling, to the narrowed section, a differential pressure sensor generating a first signal representative of a difference between a first pressure detected upstream or downstream of the narrowed section and a second pressure detected in the narrowed section; coupling, to the bypass conduit, a thermal dispersion sensor generating a second signal representative of a velocity of the mud; selecting, as a mud flow rate value, one of a first value calculated based on the first signal and on a density value of the mud, and a second value based on the second signal.

15 Claims, 4 Drawing Sheets

METHOD FOR DETERMINING A FLOW RATE OF A DRILLING MUD IN A SUBSOIL DRILLING SYSTEM

CROSS-REFERENCE TO RELATED APPLICATIONS

The present application claims priority to Italian Application No. 102022000010436, filed May 19, 2022, which is incorporated herein by specific reference.

DESCRIPTION

Field of the Invention

The present invention relates to a method and an apparatus for determining a flow rate of a drilling mud in a subsoil drilling system.

The invention also relates to a process and a system for detecting losses and/or kicks in a subsoil drilling system.

Background of the Invention

When drilling an oil well (for locating and extracting hydrocarbons in the subsoil) or a geothermal well (for locating and exploiting geothermal resources), a fluid called drilling mud is made to circulate within the borehole in order to lubricate and cool the drill bit. The drilling mud, which is taken from a source tank, is pumped into the hollow interior of the drill string and is made to flow back up to the surface within the annular space, called "annulus", defined between the drill string and the well walls. After having reached the surface, the returning mud flows, typically at atmospheric pressure, along a return tube, also known as "flow line", at the end of which the solid debris dragged by the mud is separated from the fluidic component by means of a system of vibrating sieves. The fluidic component of the mud is then fed back into the source tank.

The purpose of drilling mud circulation is, therefore, not only to lubricate and cool the drill bit, but also to convey to the surface the solid rocky debris, or "cuttings", and the fluidic products contained therein.

An additional function of the drilling mud is to support the already drilled part of the well.

Thanks to the hydrostatic pressure exerted by the mud, it is possible to balance the pressure of the fluids contained in the rocky formations during the drilling. It should be noted, in fact, that without such countering action the fluids contained in the rocky formations would flow uncontrollably in the well during the drilling. In particular, in "static" conditions, i.e., when no mud is circulating in the well, the pressure at the bottom of the well, known as "Bottom Hole Pressure" (BHP), equals the hydrostatic pressure, which essentially depends on the height and mean density of the mud column. In "dynamic" conditions, i.e., when mud is circulating in the well, the BHP value depends on the hydrostatic pressure of the mud and also on the load loss caused by the mud flowing back up along the annulus.

In normal operating conditions, i.e., when no losses or kicks occur during the drilling, the flow rate of the mud being pumped into the drill string is substantially equal to the flow rate of the mixture of mud and cuttings being conveyed towards the vibrating sieves by the flow line.

However, in the mud circuit, and typically in that portion of the well where the subsoil formation is directly exposed to the mud ("open hole"), losses or kicks may occur.

Losses typically occur when the drill bit crosses a faulted formation, or when the BHP in static and/or dynamic conditions is such as to overcome the resistance of one or more rocky formations in the open-hole well portion.

Kicks occur when the BHP cannot balance the pressure of the fluids contained in the formation, resulting in unexpected and uncontrolled intake of quantities of fluid (e.g., hydrocarbon) in the drilling mud circuit.

Therefore, drilling rigs need to be monitored in order to immediately detect the onset of critical situations such as, for example, losses and/or kicks.

The Applicant observes that measuring the rate of the mud flow within the respective tubes may provide useful indications as to the onset of losses and/or kicks.

Losses, in fact, lead to a lower flow rate reading, provided that the measurement is taken downstream the loss.

Conversely, kicks result in a higher flow rate, which, if not identified in time, may in certain drilling conditions become uncontrollable to the point that the very structure of the drilling rig may be damaged.

The Applicant has however verified that the instruments currently available for measuring the flow rate of a drilling mud cannot give sufficiently precise results in all possible drilling conditions.

In particular, the so-called electromagnetic flowmeters are precise and reliable for water-based muds only. For oil-based muds, on the contrary, they cannot return acceptable readings.

Flowmeters based on the Coriolis principle ("Coriolis flowmeters") operate in a precise and reliable manner with substantially monophasic fluids. In the case of drilling muds (which are natively complex fluids that, in operation, are found mixed with rocky residues and variable gas quantities), and especially when the quantity of gas contained in the mud exceeds certain thresholds, these flowmeters cannot ensure reliable measurements.

The Applicant has also observed that, during the drilling operations, the operating conditions in which the system has to work may vary considerably. For example, the flow of drilling mud may vary from approximately 3-5 $m^3$/min in the initial phases to approximately 0.5-0.6 $m^3$/min in the subsequent drilling phases. This may involve a reduction in the precision and accuracy of the measuring instruments.

It is therefore an object of the present invention to provide a method for determining the flow rate of drilling mud in drilling system, which can provide readings not affected by cuttings, even in high quantity, in the drilling mud.

It is another object of the present invention to provide a method for determining the flow rate of drilling mud which can provide readings not affected by gas, even in high quantity, in the drilling mud.

It is another object of the present invention to provide a method for determining the flow rate of drilling mud which can reduce the pressure drop across the measuring equipment employed, thereby reducing back flow risks.

It is another object of the present invention to provide a method for determining the flow rate of drilling mud which is capable of operating reliably and accurately with different types of drilling muds, e.g., water-based muds, oil based-muds, synthetic-based muds.

It is another object of the present invention to provide a method for determining the flow rate of drilling mud which is capable of operating reliably and accurately over a wide range of flow rates.

In addition to the above, it is therefore the object of the present invention to provide a method for detecting, losses and/or kicks in a subsoil drilling system, which can operate in a simple, accurate and reliable manner.

The Applicant notes that, by computing the mud flow rate as a function of a difference in the pressure upstream and downstream of a Venturi section, it is possible to obtain very reliable results independently of the specific drilling mud in use, and hence it is possible to execute a method for monitoring the system which ensures an immediate detection of any critical situations caused by losses/kicks.

Moreover, by using different techniques for different ranges of flow rate, it is possible to increase the measuring system turndown ratio while maintaining an optimal accuracy.

SUMMARY OF THE INVENTION

In a first aspect, the invention refers to a method for determining a flow rate of a drilling mud in a subsoil drilling system.

Preferably, wherein said system comprises a main duct and a bypass conduit.

Preferably, the bypass conduit has an inlet and an outlet connected to said main duct.

Preferably, said bypass conduit has a narrowed section between said inlet and said outlet.

Preferably, said method comprises feeding said main duct with drilling mud coming from a drilling well formed by said system.

Preferably, said mud carries cuttings generated by said system while drilling the subsoil.

Preferably, at least part of said drilling mud flows into said bypass conduit.

Preferably, said method comprises coupling a first measurement device with said narrowed section.

Preferably, the first measurement device is a differential pressure sensor configured for generating a first measurement signal.

Preferably, the first measurement signal is representative of a difference between a first pressure detected upstream or downstream of said narrowed section and a second pressure detected in said narrowed section.

Preferably, said method comprises coupling a second measurement device with said bypass conduit.

Preferably, said second measurement device is a thermal dispersion sensor configured for generating a second measurement signal.

Preferably, the second measurement signal is representative of a velocity of the mud.

Preferably, said method comprises acquiring a density value of said mud.

Preferably, said method comprises calculating a first value of the mud flow rate in the bypass conduit based on the first measurement signal.

Preferably, the first value of the mud flow rate is calculated based on the density value.

Preferably, said method comprises calculating a second value of the mud flow rate in the bypass conduit based on the second measurement signal.

Preferably, said method comprises comparing the first and second value of the mud flow rate with one or more comparison values.

Preferably, said method comprises selecting one of the first and second values of the mud flow rate based on said comparison.

Preferably, said method comprises generating an electrical output signal indicative of the selected flow rate value.

In a second aspect, the invention refers to a process for detecting losses and/or kicks in a subsoil drilling system.

Preferably, said process comprises carrying out said method.

Preferably, said process comprises making a comparison between the flow rate of the drilling mud in the bypass conduit and one or more reference parameters.

Preferably, said reference parameters are representative of a presence or absence of possible losses and/or kicks.

Preferably, said process comprises generating a notification signal as a function of said comparison.

In a third aspect, the invention refers to an apparatus for determining a flow rate of a drilling mud in a subsoil drilling system.

Preferably, said apparatus comprises a bypass conduit having an inlet and an outlet connectable to a main duct of said drilling system.

Preferably, said bypass conduit has a narrowed section between said inlet and said outlet.

Preferably, said bypass conduit is configured to receive from said main duct drilling mud coming from a drilling well formed by said system.

Preferably, said mud carries cuttings generated by said system while drilling the subsoil.

Preferably, said apparatus comprises a first measurement device.

Preferably, the first measurement device is coupled with said narrowed section.

Preferably, the first measurement device is a differential pressure sensor configured for generating a first measurement signal.

Preferably, the first measurement signal is representative of a difference between a first pressure detected in said narrowed section and a second pressure detected upstream or downstream of said narrowed section.

Preferably, said apparatus a second measurement device.

Preferably, the second measurement device is coupled to said bypass conduit.

Preferably, said second measurement device is a thermal dispersion sensor configured for generating a second measurement signal.

Preferably, the second measurement signal is representative of a velocity of the mud.

Preferably, said apparatus comprises a processor.

Preferably, the processor is configured for acquiring a density value of said mud.

Preferably, the processor is configured for calculating a first value of the mud flow rate in the bypass conduit based on the first measurement signal.

Preferably, the processor is configured for calculating a first value of the mud flow rate in the bypass conduit based on the density value.

Preferably, the processor is configured for calculating a second value of the mud flow rate in the bypass conduit based on the second measurement signal.

Preferably, the processor is configured for comparing the first and second value of the mud flow rate with one or more comparison values.

Preferably, the processor is configured for selecting one of the first and second values of the mud flow rate based on said comparison.

Preferably, the processor is configured for generating an electrical output signal indicative of the selected flow rate value.

In a fourth aspect, the invention refers to a system for detecting losses and/or kicks in a subsoil drilling system.

Preferably, said system comprises said apparatus.

Preferably, said processor is configured for making a comparison between the flow rate of the drilling mud in the bypass conduit and one or more reference parameters.

Preferably, said one or more reference parameters are representative of a presence or absence of possible losses and/or kicks.

Preferably, said processor is configured for generating a notification signal as a function of said comparison.

In one or more of the aforesaid aspects, the invention can comprise one or more of the following preferred features.

Preferably, said bypass conduit comprises a first tract that is substantially vertical and extends from said inlet.

Preferably, said bypass conduit comprises a second tract that is inclined with respect to the first tract and terminates with said outlet.

Preferably, said bypass conduit comprises a connection portion connecting the first tract and the second tract.

Preferably, said narrowed section is arranged on said second tract.

Preferably, said first sensor is arranged on said second tract.

Preferably, said second measurement device is coupled to said first tract.

Preferably, in order to acquire said density value, provision is made to couple a third measurement device with said bypass conduit.

Preferably, the third measurement device is a differential pressure sensor configured for generating a third measurement signal.

Preferably, the third measurement signal is representative of a difference between a third and a fourth pressure.

Preferably, in order to acquire said density value, provision is made to calculate the density value based on said third measurement signal.

Preferably, said third pressure and fourth pressure are detected at a positions along the bypass conduit having substantially the same cross-section area.

Preferably, said third and fourth pressure are detected along said first tract.

Preferably, said one or more comparison values comprise a threshold value.

Preferably, provision is made to compare the first flow rate value with the threshold value.

Preferably, provision is made to compare the second flow rate value with the threshold value.

Preferably, if the first flow rate value is higher than the threshold value, provision is made to calculate the flow rate of the drilling mud in the bypass conduit based on the first flow rate value.

Preferably, if the first flow rate value is higher than the threshold value, the second flow rate value is disregarded.

Preferably, if the second flow rate value is lower than the threshold value, provision is made to calculate the flow rate of the drilling mud in the bypass conduit based on the second flow rate value.

Preferably, if the second flow rate value is lower than the threshold value, the first flow rate value is disregarded.

Preferably, said main duct is located upstream of one or more stations configured to separate said mud from said cuttings.

Preferably, no stations configured for separating the mud from the cuttings are present between the drilling well and the main duct.

Preferably, said one or more reference parameters are correlated with a flow rate of drilling mud being fed to said drilling well.

Preferably, a port for removal of cuttings is provided in the connection portion of said bypass conduit.

Further features and advantages will become more apparent in the light of the following detailed description of a preferred, but non-limiting, embodiment of the invention.

BRIEF DESCRIPTION OF THE DRAWINGS

The description is provided herein with reference to the annexed drawings, which are also supplied by way of non-limiting example, wherein.

DETAILED DESCRIPTION OF PREFERRED EMBODIMENTS OF THE INVENTION

The method according to the present invention applies to the field of construction and development of oil and/or geothermal wells.

In particular, the method is used whenever at least one well W is to be drilled in order to access oil or geothermal resources in the subsoil.

The well W is drilled by a rig (or drilling system) 1 of a known type (FIG. 1), which comprises a supporting structure 10 and a motor 20 mounted on such supporting structure. In particular, the motor 20 may be constrained to the supporting structure 10 by means of a hook, which allows it to translate along a substantially vertical axis. The rotary motion generated by the motor 20 is transferred to a drill bit 40 via a structure made up of rods 30. The rods 30 consist of tubular sections with threaded ends which, being assembled according to a predefined longitudinal development, allow the drill bit 40 to reach depths as low as a few thousands of metres while continuing to rotate about its own longitudinal axis.

The assembly of the rods 30 and the drill bit 40 will be referred to below and in the appended claims as "drill pipe".

In order to effect the drilling, mud is fed to the drill pipe; the mud being pumped through the rods 30 reaches the drill bit 40. After flowing out through the terminal part of the drill bit 40, the mud flows back up through the well W, returning to the top opening situated at the supporting structure 10.

Figure 1:
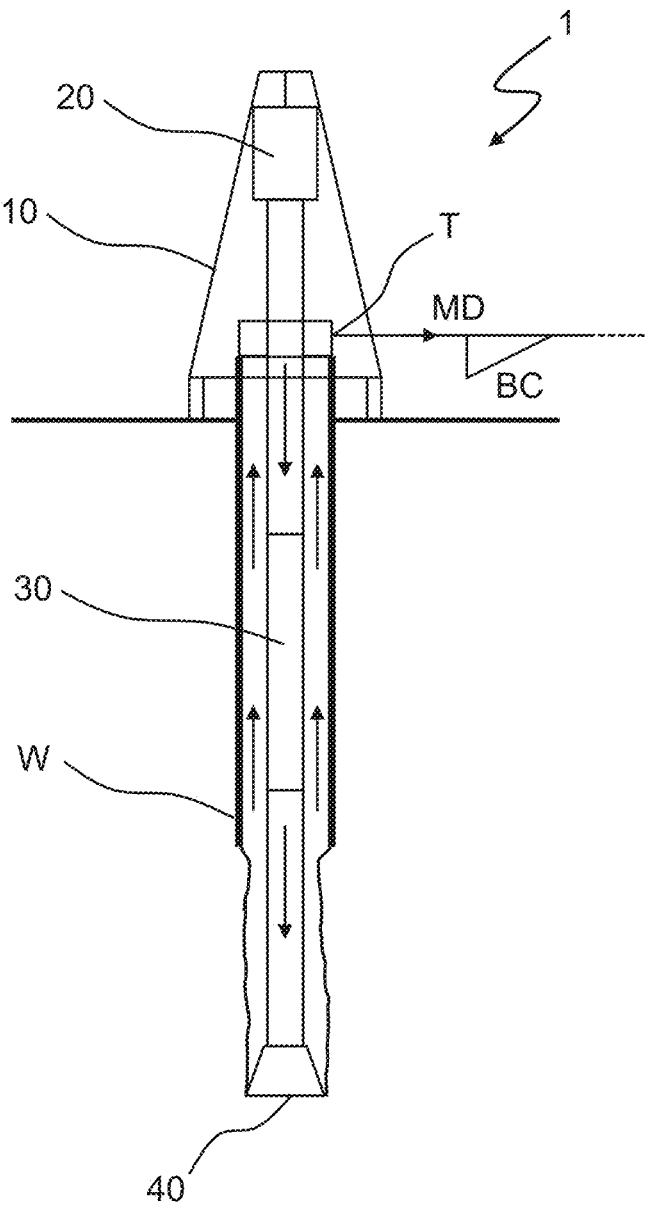
FIG. 1 schematically shows a rig whereon the invention can be implemented.

In FIG. 1, the downward pointing arrows on the rods 30 represent the mud flow towards the drill bit 40, while the upward pointing arrows, outside the rods, represent the mud flow returning to the surface.

FIG. 1 also shows a main duct MD, through which the returning mud flows towards the vibrating sieves (not shown), where it will be separated from the cuttings, possibly analyzed, and then stored for reuse, if necessary. From a practical point of view, the main duct MD is—or is part of—the so-called "flow line".

Note that in FIG. 1 the above-described elements are depicted in a schematic manner, without necessarily observing the actual proportions among the dimensions of such elements.

Note also that, in the present context, the terms "upstream" and "downstream" should be understood with reference to the direction of the mud flow.

Figure 2:
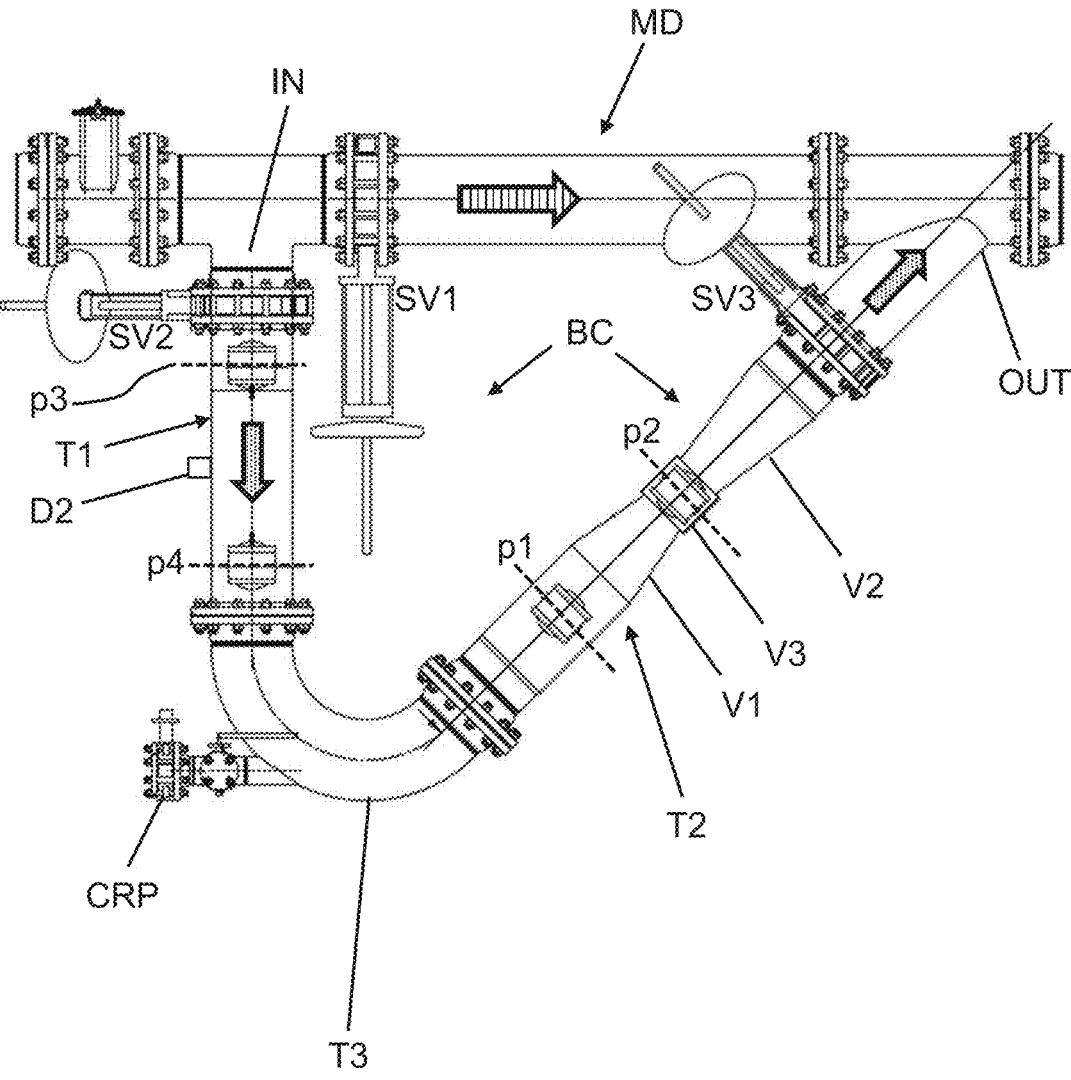
FIG. 2 shows a schematized part of the rig of FIG. 1.

In order to make measurements of the drilling mud flow rate and possibly detect any losses and/or kicks in a subsoil drilling system, which is represented by way of example by the rig 1 schematically shown in FIG. 1 and briefly described above, a number of steps are carried out at a bypass conduit BC, associated to the main duct MD, through which the drilling mud flows (FIG. 2).

The measurements are taken on the drilling mud exiting the well, i.e., the mud that has flowed through the well along the top-down direction and then has flowed back up along the bottom-up direction.

In particular, the bypass conduit BC is fed with drilling mud coming from the well W, i.e., the mud that, after having been injected into the well W, has flowed back to the surface through the annulus.

The mud includes the cuttings produced by the drilling activity, i.e., the cuttings generated by the drilling system 1 while drilling the subsoil.

Such mud typically also includes fluids absorbed in the subsoil. For simplicity, the term "mud" will hereafter also indicate mud combined with fluids and/or cuttings.

It has to be noticed that the mud that reaches the main duct MD, and thus the bypass conduit BC, is not separated from the cuttings it has carried from the well. No station(s) configured to separate the returning mud and the cuttings is present between the outlet of the well W and the main duct MD. In an embodiment, the main duct MD and the bypass conduit BC (i.e., the duct in which measurements according to the present invention are carried out) are located between the outlet of the well W (from which the returning mud flows) and the aforesaid vibrating sieves (or, in general, separating station(s) configured to separate the mud from the cuttings). In other terms, station(s) configured to separate the mud from the cuttings is/are installed downstream of the main duct MD and bypass conduit BC.

The Applicant observes that performing measurements on a mud which still includes the cuttings allows obtaining more reliable results, as the measurements are carries out in conditions more similar to those inside the wellbore.

As said, the measurements that will be described below are taken on the mud flowing through the bypass conduit BC.

The mud flow is regulated by the shut-off valves SV1, SV2, SV3: the mud normally flows in the main duct MD; for this condition to occur, the shut-off valve SV1 is open and the shut-off valves SV2, SV3 are closed. When measurements need to be taken in accordance with the invention, the shut-off valve SV1 is closed and the shut-off valves SV2, SV3 are opened. In this way, the mud will entirely flow in the bypass conduit BC before flowing again in the main duct MD.

Preferably, the bypass conduit BC has a smaller cross-section than the main duct MD.

In the diagram of FIG. 2, the striped arrow represents the mud flow in the main duct MD, whereas the dotted arrows represent the mud flow in the bypass conduit BC. In any operating condition, the mud flow is conveyed towards the vibrating sieves either through the main duct MD or through the bypass conduit BC. In other words, no operating conditions are envisaged wherein it simultaneously occurs that part of the mud flows in the main duct MD and part of the mud flows in the bypass conduit BC.

The Applicant observes that the main duct MD and the bypass conduit BC are not parts of a pressurized system: the drilling mud is pumped into the drill pipe and, after exiting through the drill bit, flows back up to the surface along the annulus by exploiting the thrust provided by the pumping equipment. As it exits the annulus (substantially at the point T schematized in FIG. 1), the mud "sees" the outside environment and the atmospheric pressure. At this point, the mud is fed to the main duct MD and then to the bypass conduit BC. Within the latter, the pressure initially provided by the pumping equipment has exhausted, and the mud essentially flows only by gravity, due to the slope of the main duct MD. In other words, the drilling mud first encounters, as it flows through the system, a pressurized environment consisting of sealed elements, which allow the pumping equipment to exert on the mud the action necessary for it to flow down through the drill pipe and then back up along the annulus during the return phase. At the end of the return phase, the ducts in which the mud flows (e.g., the main duct MD and the bypass conduit BC) do not have a sealed connection with the annulus and therefore allow the mud to flow at ambient pressure.

As shown in FIG. 2, the bypass conduit BC preferably comprises a first tract T1, a second tract T2 and a connection portion T3.

The first tract T1 is substantially vertical; it extends from the inlet IN of the bypass conduit BC. In practical terms, the inlet of the bypass conduit BC coincides with the inlet aperture of the first tract T1.

The connection portion T3 connects the first tract T1 with the second tract T2. The connection portion T3 is preferably that part of the bypass conduit BC having the minimum height with respect to ground.

Preferably, the connection portion T3 has a curved extension, so as to join the different orientations of the first and second tract T1, T2.

In an embodiment, the connection portion T3 features a port CRP for removal of cuttings. Port CRP is advantageously used when the flow of mud in the bypass conduit BC is stopped, and cuttings tend to accumulate by gravity in the connection portion T3.

The second tract T2 extends from the connection portion T3 to the outlet OUT of the bypass conduit BC. In practical terms, the outlet OUT of the bypass conduit BC coincides with the outlet of the second tract T2.

The second tract T2 has a substantially rectilinear extension.

The second tract T2 has a determined inclination with respect to ground (and with respect to the first tract T1). For example, inclination of the second tract T2 can be comprised between 40° and 50°. The inclination can, in general, vary also outside this range, depending on the specific configuration and encumbrance constraints of the system in which the bypass conduit BC has to be installed.

Figure 3:
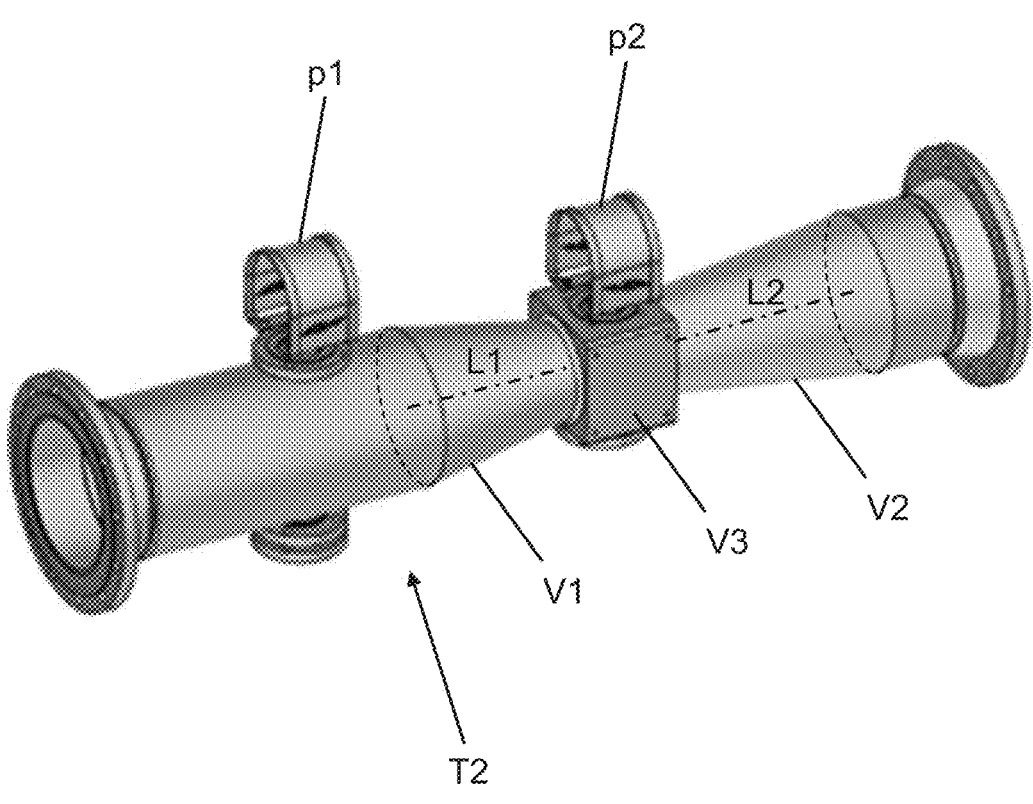
FIG. 3 shows a schematized view of the part of FIG. 2.

The bypass conduit BC presents a narrowed section V (FIGS. 2, 3).

Preferably, the narrowed section V is included in the second tract T2.

Preferably, the narrowed section V comprises a first frustoconical portion V1; the first frustoconical portion V1 has a larger base (i.e., that part having the largest cross-section) towards the third tract T3, and a smaller base (i.e., that part having the smallest cross-section) towards the outlet OUT.

Preferably, the narrowed section V comprises a second frustoconical portion V2; the second frustoconical portion V2 has a smaller base (i.e., that part having the smallest cross-section) towards the third tract T3, and a larger cross-section (i.e., that part having the largest cross-section) towards the outlet OUT.

The second frustoconical portion V2 is arranged downstream of the first frustoconical portion V1.

Preferably, the smaller base of the first frustoconical portion V1 substantially faces the smaller base of the second frustoconical portion V2.

Preferably, the smallest cross-section of the first frustoconical portion V1 is equal to the smallest cross-section of the second frustoconical portion V2.

Preferably, the largest cross-section of the first frustoconical portion V1 is equal to the largest cross-section of the second frustoconical portion V2.

Preferably, the largest cross-section of the first frustoconical portion V1 is substantially equal to the cross-section of the first and third tract T1, T3.

Preferably, the larger cross-section of the second frustoconical portion V2 is substantially equal to the cross-section of the first and third tract T1, T3.

Preferably, a linkage portion V3—having a cylindrical shape and a diameter substantially equal to that of the smaller base of the first frustoconical section V1 and/or the smaller base of the second frustoconical portion V2—connects the smaller base of the first frustoconical portion V1 to the smaller base of the second frustoconical portion V2.

In practical terms, the narrowed section V form a Venturi section, wherein a pressure drop is generated by the geometrical shape of conduit.

The first frustoconical portion V1 is a converging portion; the second frustoconical portion V2 is a diverging portion; the linkage portion V3 is the minimum cross-section portion, usually referred to as "throat"; the part of the second tract T2 upstream of the first frustoconical portion V1 is usually referred to as "entry".

As schematically shown in FIG. 3, the axial length L1 of the first frustoconical portion V1 is shorter than the axial length of the second frustoconical portion V2.

The Applicant notes that lengths L1, L2 can be determined according to ISO standard 5167-4, once the diameter and the tilt of the first and second tract T1, T2 are defined.

A first measurement device D1 is coupled with said narrowed section V.

The first measurement device D1 is a differential pressure sensor.

The first measurement device D1 is configured to generate a first measurement signal MS1.

The first measurement signal MS1 is representative of a pressure difference related to the narrowed section V.

In greater detail, the measurement signal MS1 is representative of a difference between a first pressure p1 and a second pressure p2.

The first pressure p1 is detected upstream of the narrowed section V, and the second pressure p2 is detected in the narrowed section V.

In particular, the second pressure p2 is detected downstream of the first frustoconical portion V1, for example in the linkage portion V3.

In an embodiment, the first pressure p1 can be detected downstream of the second frustoconical portion V2.

As will be disclosed in the following, the difference between the first and second pressure p1, p2 is used for calculating a first value of the mud flow rate in the bypass conduit BC. Specifically, the Applicant observes that the difference between the first pressure p1 and the second pressure p2 is substantially proportional to the mud flow rate flowing from the section at which the first pressure p1 is detected and the section at which the second pressure is detected.

As said, the geometry, and in particular the inclination of the bypass conduit BC is not defined a priori in a strict way; it has to be adapted to each specific installation. Accordingly, a software is provided (on which operation of processor 220, disclosed in the following, is based), which allows taking into account the configuration of the installation geometry. In this way, the impact of inclination of the bypass conduit BC is properly considered when calculating the mud flow rate as a function of the difference between the first and second pressure p1, p2.

A second measurement device D2 is coupled with the bypass conduit BC. The second measurement device D2 is a thermal dispersion sensor.

In a per se known manner, the second measurement device D2 provides an output representative of the velocity of the mud in the bypass conduit BC; such velocity can then be processed in order to obtain the mud flow rate.

Preferably, the second measurement device D2 generates a second measurement signal MS2 representative of a velocity of the mud in the bypass conduit BC. From a practical point of view, the second measurement device D2 provides as output a current (e.g., comprised between 4 mA and 20 mA, although also different current ranges can be employed) which is proportional to the mud's velocity. The processor 220 (which, as said, will be better disclosed in the following) is provided with a pre-stored conversion function—that can be represented, for example, as a table, a curve, etc.—which allows to determine the mud's velocity based on the second measurement signal MS2; by multiplying the mud's velocity by the bypass conduit BC cross-section area, it is then possible to calculate a second value for the mud flow rate.

In particular, the Applicant observes that a thermal dispersion sensor is preferably based on convective heat transfer; a first sensor element is at the process temperature and a second sensor element is being heated by a constant power; as the flow rate increases, the temperature difference between the two sensor elements decreases.

Preferably, the second measurement device D2 is arranged on the first tract T1.

In an embodiment, a third measurement device D3 is provided.

The third measurement device D3 is a differential pressure sensor.

In an embodiment, the third measurement device D3 can be almost identical to the first measurement device D1.

The third measurement device D3 generates a third measurement signal MS3, representative of a difference between a third pressure p3 and a fourth pressure p4, preferably detected along the first tract T1.

The third pressure p3 and the fourth pressure p4 are measured at positions having the same cross-section.

In a per se known manner, based on the difference between the third and fourth pressure p3, p4, a density of the mud is calculated.

Advantageously, the density of the mud so calculated is employed to calculate the first value of the mud flow rate, also using the first measurement signal MS1.

In an embodiment, the second measurement device D2 is arranged between the sections at which the third and fourth pressure p3, p4 are detected.

In view of the above, a first value of the mud flow rate is calculated based on the first and third measurement signals MS1, MS3, and a second value of the mud flow rate is calculated based on the second measurement signal MS2.

Preferably, the flow rate of the drilling mud in the bypass conduit BC is determined selecting a flow rate value from those generated based on the first measurement signal MS1 (in cooperation with the third measurement signal MS3) and the second measurement signal MS2.

In greater detail, the first and second flow rate values are compared with one or more comparison values, and the flow rate of the drilling mud in the bypass conduit BC is determined based on such comparison.

Preferably, the one or more comparison values comprise a threshold value TH; the first flow rate value is compared with the threshold value TH, and the second flow rate value with the threshold value TH. If the first flow rate value is higher than the threshold value, the flow rate of the drilling mud in the bypass conduit BC is calculated based on the first flow rate value, disregarding the second flow rate value; in this case, the flow rate of the drilling mud in the bypass conduit BC is preferably set equal to the first flow rate value. If the second flow rate value is lower than the threshold value, the flow rate of the drilling mud in the bypass conduit BC is calculated based on the second flow rate value, disregarding the first flow rate value; in this case, the flow rate of the drilling mud in the bypass conduit BC is preferably set equal to the second flow rate value.

An electrical output signal OS, indicative of the flow rate so determined, is generated, so as to make the calculation result available to an operator and/or for further processing.

The Applicant observes that typically using a differential pressure technique for determining the mud flow rate provides accurate and reliable values when the flow rate is comprised between about 200 l/min and about 7000 l/min, and using a thermal dispersion sensor provides accurate and reliable values when the flow rate is comprised between about 10 l/min and about 250 l/min.

By setting the threshold value TH in the range 200-250 l/min, it is possible to select the most appropriate technique depending on the current flow rate value.

From a practical point of view, when a flow rate measurement is to be performed, both the first and second measurement signals MS1, MS2 are read (in addition to the third signal MS3); depending on the flow rate values obtained, compared with the threshold value TH, the first or second flow rate value is selected in order to output the calculated flow rate.

Accordingly, the invention allows covering a wide measurement range of flow rates, approximately from 10 l/min to 7000 l/min, significantly increasing the turndown ratio of a standard Venturi flowmeter.

Preferably, the calculated flow rate is compared with one or more reference parameters RP.

Preferably, said one or more reference parameters RP are correlated with the rate of flow of drilling mud being fed to the well (also referred to, for simplicity, as input flow rate). By contrast, as said, the flow rate calculated as disclosed above refers to the flow of mud exiting the well.

In one embodiment, it is envisaged to calculate the time integral, for a predetermined interval, of the difference between the input flow rate and the flow rate computed for the bypass conduit BC.

If such integral has a value falling within an allowable range (e.g., above a minimum threshold and/or below a maximum threshold), then the system will not signal any criticality.

If such integral (considered with its sign) has a value that does not fall within the allowable range, then the system will generate a notification signal NS.

In particular, let us consider the following quantity:

$$I = \int_{t1}^{t2} [Q_{TD}(t) - Q_{in}(t)]dt$$

wherein $Q_{TD}(t)$ is the flow rate in the bypass conduit $Q_{in}(t)$ is the input flow rate t1, t2 are the ends of the predetermined time range.

If the value of I (considered with its sign) exceeds a maximum threshold, this means—in short—that the flow rate in the bypass conduit BC is assuming anomalous values that are greater than the input flow rate. This may indicate a kick, and the system will generate a corresponding signalling.

If the value of I (considered with its sign) is below a minimum threshold, this means—in short—that the flow rate in the bypass conduit BC is assuming anomalous values that are smaller than the input flow rate. This may indicate a loss, and the system will generate a corresponding signalling.

If the value of the integral remains within the allowable range, the system may either generate no signalling or send a signal representative of the fact that the situation is currently not showing any criticality as to possible kicks or losses.

In one embodiment, it is determined whether the difference between the flow rate in the bypass conduit BC and the input flow rate $(Q_{TD}-Q_{in})$ remains above a maximum threshold, or below a minimum threshold, for a predetermined time.

If this happens, the system will generate a suitable signalling. In particular:

if the flow rate $Q_{TD}$ remains greater than the flow rate $Q_{in}$ for a predetermined time, this may indicate a kick, and the system will generate a suitable signalling;

if the flow rate $Q_{TD}$ remains smaller than the flow rate $Q_{in}$ for a predetermined time, this may indicate a loss, and the system will generate a suitable signalling.

Preferably, the notification signal NS may have at least two different types of contents: potential kick risk and potential loss risk.

Figure 4:
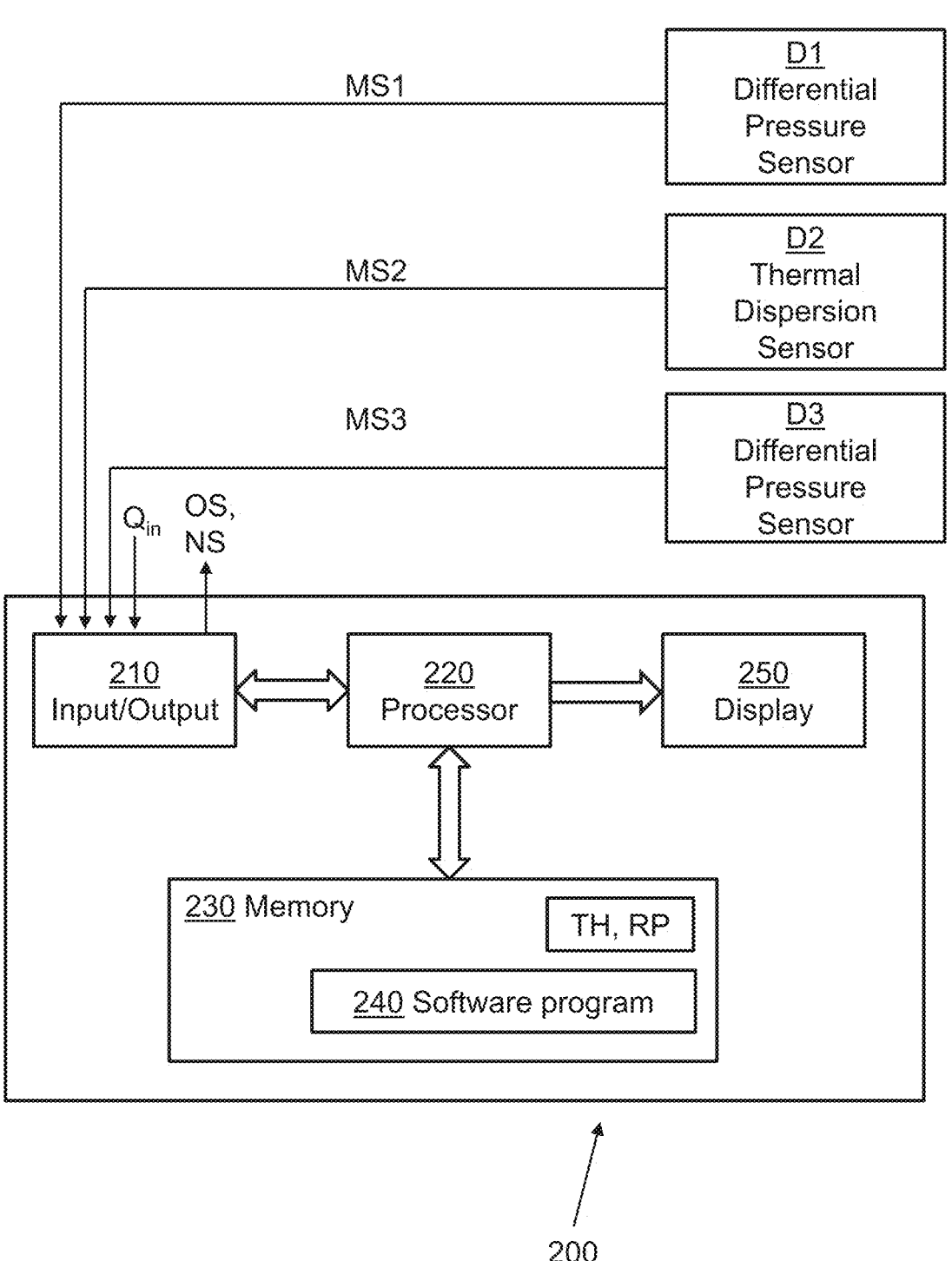
FIG. 4 shows a block diagram of an apparatus for executing the processing envisaged by the method according to the present invention.

FIG. 4 shows, by way of example, an electronic apparatus 200, e.g., a computer or a similar apparatus, configured for executing the processing tasks envisaged by the method according to the present invention. The electronic apparatus 200 is provided with an input/output device 210, which is used for reading the detections of measurement devices D1-D3 (namely, first, second and third measurement signals MS1-MS3) and acquiring information about the input flow rate $Q_{in}$. The electronic apparatus 200 comprises also a processor 220, which may be implemented for example as a microprocessor. The task of the processor 220 is to compute the flow rate $Q_{TD}$ in the bypass conduit BC and possibly compare it with the reference parameters RP. In particular, the processor 220 may carry out the processing disclosed above and calculate the flow rate $Q_{TD}$ and generate the output signal OS. Furthermore, the processor 220 may also calculate the difference between $Q_{TD}$ and $Q_{IN}$ as described above, to then generate the notification signal NS whenever necessary.

The electronic apparatus 200 may be provided with a non-volatile memory 230, which stores, for example, the content of the measurement signals MS1-MS3, the threshold value TH, the reference parameter(s) RP, the flow rate values $Q_{TD}$, $Q_{IN}$ and the other computed values (e.g., the flow rate difference, the time integral, etc.). The memory 230 may be used for storing a software program 240 that comprises instructions readable by the processor 220 for the execution of the processing tasks envisaged by the present invention. The processor 220 is connected to the input/output device 210 and to the memory 230, and is used for executing the software program in order to calculate the flow rate in the bypass conduit BC and generate the output signal OS and/or the notification signal NS. The electronic apparatus 200 may further comprise a visualization device 250, e.g., a display, which may allow a user to display the data generated/processed by the processor 220.

Preferably, the processor 220 can be configured to perform one or more of the following operations (preferably, all the following operations):

Calculating the density of the mud, based on the third measurement signal MS3, the latter being representative of the third and fourth pressure p3, p4 and/or a difference between the third and fourth pressure p3, p4;

Calculating the first flow rate value, based on the first measurement signal MS1, the latter being representative of the first and second pressure p1, p2 and/or a difference between the first and second pressure p1, p2; the first flow rate value is calculated also based on the mud density determined based on the third measurement signal MS3;

Calculating the second flow rate value, based on the second measurement signal MS2, the latter being representative of a velocity of the mud;

Comparing the first and second flow rate values with the threshold TH;

Selecting, between the first and second flow rate values, the appropriate value, based on the comparison, Generating the output signal OS, indicative of the selected flow rate value.

Thus, put briefly, the raw data detected by measurement devices D1-D3 are, respectively:

The first and second pressure p1, p2;

The velocity of the mud;

The third and fourth pressure p3, p4.

In addition to the above, it has to be noted that the output signal OS and/or the notification signal NS can be provided to the display 250, for a visualization of the relevant information embedded therein.

The invention attains important advantages.

Firstly, the flow rate measurements are not affected by the presence of gas and/or cuttings in the drilling mud.

Moreover, a reduced pressure drop occurs across the differential pressure meter, compared for example to known Coriolis flowmeters, reducing back flow risks.

The detection system does not include moving parts, thereby reducing risks of mechanical troubles and maintenance effort, and increasing the detection reliability.

The technique herein disclosed can operate reliably and accurately with different installation geometries, which can be designed to minimize abrasion/erosion drilling mud effects, to minimize pressure drops of the system, to minimize possibility of cuttings accumulation inside the flowmeter and to maximize the readings accuracy and to minimize the encumbrance.

The technique herein disclosed can operate reliably and accurately with different types of drilling muds, e.g., water-based muds, oil-based muds, synthetic-based muds.

The technique herein disclosed features an increased turndown ratio compared to known solutions, e.g., conventional Venturi flowmeters.

Furthermore, the invention makes it possible to detect, in a simple, precise and reliable manner, the presence of losses and/or kicks in a drilling rig.

Another advantage concerns the fact that the invention is easily applicable to an existing rig, requiring only minimal modifications to the system structure.

The invention claimed is:

1. A method for determining a flow rate of a drilling mud in a subsoil drilling system, wherein said system comprises a main duct and a bypass conduit having an inlet and an outlet connected to said main duct, said bypass conduit having a narrowed section between said inlet and said outlet, said method comprising:

feeding said main duct with drilling mud coming from a drilling well formed by said system, wherein said mud carries cuttings generated by said system while drilling the subsoil, so that at least part of said drilling mud flows into said bypass conduit;

coupling a first measurement device with said narrowed section, the first measurement device being a differential pressure sensor configured for generating a first measurement signal representative of a difference between a first pressure detected upstream or downstream of said narrowed section and a second pressure detected in said narrowed section;

coupling a second measurement device with said bypass conduit, said second measurement device being a thermal dispersion sensor configured for generating a second measurement signal representative of a velocity of the mud;

acquiring a density value of said mud;

calculating a first value of the mud flow rate in the bypass conduit based on the first measurement signal and on the density value;

calculating a second value of the mud flow rate in the bypass conduit based on the second measurement signal;

comparing the first and second value of the mud flow rate with one or more comparison values;

selecting one of the first and second values of the mud flow rate based on said comparison;

generating an electrical output signal indicative of the selected flow rate value.

2. The method according to claim 1, wherein said bypass conduit comprises:

a first tract that is substantially vertical and extends from said inlet;

a second tract that is inclined with respect to the first tract and terminates with said outlet;

a connection portion connecting the first tract and the second tract.

3. The method according to claim 2, wherein said narrowed section and the first sensor are arranged on said second tract.

4. The method according to claim 2, wherein said second measurement device is coupled to said first tract.

5. The method according to claim 1, wherein acquiring the density value comprises:

coupling a third measurement device with the bypass conduit, the third measurement device being a differential pressure sensor configured to generate a third measurement signal representative of a difference between a third and a fourth pressure;

calculating the density value based on said third measurement signal.

6. The method according to claim 5, wherein said third pressure and fourth pressure are detected at positions along the bypass conduit having substantially the same cross-section area.

7. The method according to claim 5, wherein said third and fourth pressure are detected along said first tract.

8. The method according to claim 7, wherein said one or more comparison values comprise a threshold value, said method comprising:

comparing the first flow rate value with the threshold value;

comparing the second flow rate value with the threshold value;

if the first flow rate value is higher than the threshold value, calculating the flow rate of the drilling mud in the bypass conduit based on the first flow rate value, disregarding the second flow rate value;

if the second flow rate value is lower than the threshold value, calculating the flow rate of the drilling mud in the bypass conduit based on the second flow rate value, disregarding the first flow rate value.

9. The method according to claim 1, wherein said main duct is located upstream of one or more stations configured to separate said mud from said cuttings.

10. The method according to claim 1, wherein no stations configured for separating the mud from the cuttings are present between the drilling well and the main duct.

11. A process for detecting losses and/or kicks in a subsoil drilling system, comprising:

carrying out the method according to claim 1;

making a comparison between the flow rate of the drilling mud in the bypass conduit and one or more reference parameters, said reference parameters being representative of a presence or absence of possible losses and/or kicks;

generating a notification signal as a function of said comparison.

12. The process according to claim 11, wherein said one or more reference parameters are correlated with a flow rate of drilling mud being fed to said drilling well.

13. An apparatus for determining a flow rate of a drilling mud in a subsoil drilling system, comprising:

a bypass conduit having an inlet and an outlet connectable to a main duct of said drilling system, said bypass conduit having a narrowed section between said inlet and said outlet, wherein said bypass conduit is configured to receive from said main duct drilling mud coming from a drilling well formed by said system, wherein said mud carries cuttings generated by said system while drilling the subsoil;

a first measurement device coupled with said narrowed section, the first measurement device being a differential pressure sensor configured for generating a first measurement signal representative of a difference between a first pressure detected in said narrowed section and a second pressure detected upstream or downstream of said narrowed section;

a second measurement device coupled to said bypass conduit, said second measurement device being a thermal dispersion sensor configured for generating a second measurement signal representative of a velocity of the mud;

a processor, configured for:

acquiring a density value of said mud;

calculating a first value of the mud flow rate in the bypass conduit based on the first measurement signal and on the density value;

calculating a second value of the mud flow rate in the bypass conduit based on the second measurement signal;

comparing the first and second value of the mud flow rate with one or more comparison values;

selecting one of the first and second values of the mud flow rate based on said comparison;

generating an electrical output signal indicative of the selected flow rate value.

14. The apparatus according to claim 13, wherein said bypass conduit comprises:

a first tract that is substantially vertical and extends from said inlet;

a second tract that is inclined with respect to the first tract and terminates with said outlet;

a connection portion connecting the first tract and the second tract, wherein a port for removal of cuttings is provided in said connection portion.

15. A system for detecting losses and/or kicks in a subsoil drilling system, comprising the apparatus of claim 13, wherein said processor is further configured for:

making a comparison between the flow rate of the drilling mud in the bypass conduit and one or more reference parameters, said reference parameters being representative of a presence or absence of possible losses and/or kicks;

generating a notification signal as a function of said comparison.

* * * * *